United States Patent [19]
Pasquerella et al.

[11] Patent Number: 5,497,560
[45] Date of Patent: Mar. 12, 1996

[54] DEPTH FINDER

[76] Inventors: David Pasquerella, 99 Kensington Oval, New Rochelle, N.Y. 10805; Richard Colbert, 345 Bedford Ave., Mount Vernon, N.Y. 10553

[21] Appl. No.: 379,177

[22] Filed: Jan. 27, 1995

[51] Int. Cl.⁶ ..................................................... G01B 5/06
[52] U.S. Cl. .............................. 33/836; 33/558.4; 33/832
[58] Field of Search ............................. 33/836, 542, 544, 33/544.2, 542.1, 558.01, 558.2, 558.4, 832, 833

[56] References Cited

U.S. PATENT DOCUMENTS

| | | | |
|---|---|---|---|
| 1,526,418 | 2/1925 | Gronner | 33/836 |
| 2,957,247 | 10/1960 | Brown et al. | 33/836 |
| 3,016,619 | 1/1962 | Mueller | 33/836 |
| 3,716,922 | 2/1973 | Shaver | 33/833 |
| 5,171,248 | 12/1992 | Ellis | 33/542.1 |
| 5,226,240 | 7/1993 | Stark | 33/542 |

FOREIGN PATENT DOCUMENTS

| | | | |
|---|---|---|---|
| 565544 | 11/1944 | United Kingdom | 33/542 |
| 886068 | 1/1962 | United Kingdom | 33/836 |

*Primary Examiner*—Christopher W. Fulton
*Attorney, Agent, or Firm*—Martin J. Spellman, Jr.

[57] ABSTRACT

An apparatus for determining the thickness of a slab structure in which a cylindrical bore has been made. The device comprising a cylindrical tube having opposed longitudinal oriented openings in the wall at the distal end of the cylinder. The cylinder having an indicia scale of length running longitudinally and visibly on the outer surface of the cylinder with the zero point starting at the inner end of the openings. The device having a shaft within the tube having a length greater than the length of the tube, a handle on the proximal end, and a pair of butterfly arms on the distal end of the shaft. The butterfly arms being biased in the outward direction so that when the arms are opposed to the openings in the tube they will extend outward through the openings to engage the outer surface of the slab with the tube extending through the bore in the slab so that the indicia can be read on the inside of the slab to determine the thickness of the slab.

1 Claim, 2 Drawing Sheets

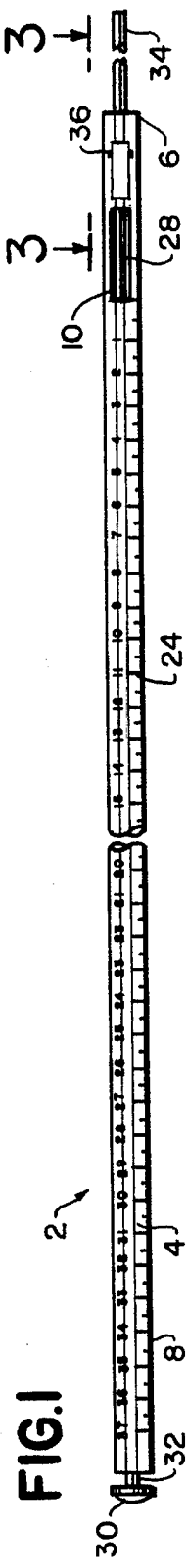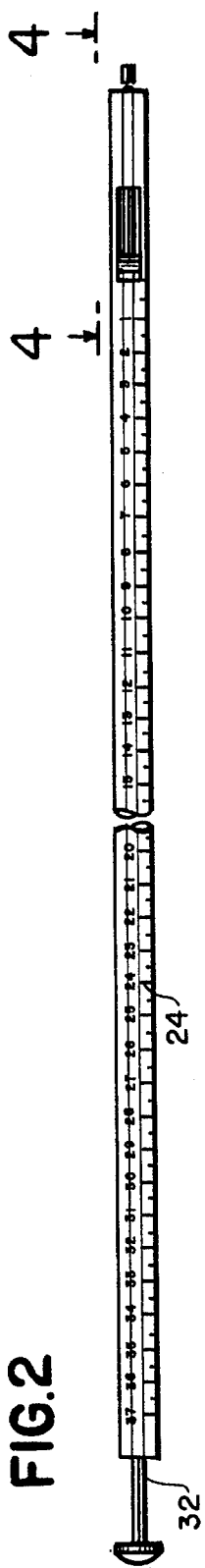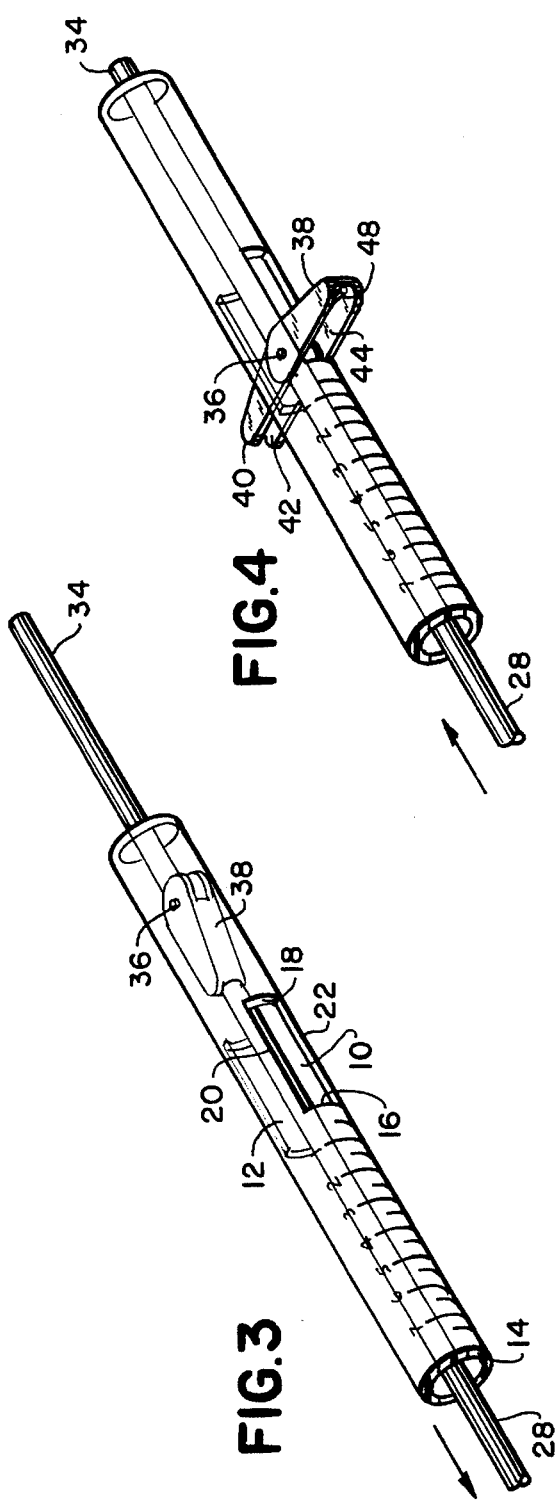

DEPTH FINDER

BACKGROUND OF THE INVENTION

1. Field of the Invention

This invention concerns a measuring instrument for determining the thickness of elements such as walls, flooring, ceilings and other panel and/or slab type of structures, particularly in the building construction environment, although it is useful in other settings.

In the construction and maintenance industry it is often necessary and/or desirable to quickly determine the thickness of a ceiling wall or floor slab. In most cases, where an end or sectional observation is not possible or practical, a small aperture is bored in the element to be measured and one worker is stationed on one side of the wall, another worker is stationed on opposite side at the bored aperture, and a measuring device such as a ruler or measuring tape or other common type of indicia is placed through the opening and the base indicia recorded on one side and the spaced indicia on the other side recorded. The difference indicates the thickness of the wall either by subtraction or a direct reading on the surface by the individual making the recording of the thickness.

It is obvious that this method takes two workers to accomplish and the possibility of errors is multiplied due to the fact that there are two observers who are not in direct visual communication with each other.

The present invention provides a depth or thickness finder for rapidly and easily enabling one person to determine the thickness of a floor slab, wall, or ceiling once a relatively small shaft/opening is made through the element to be measured.

2. Prior Art

Applicants are not aware of any very simple device whereby an individual can directly determine the thickness of a wall, floor, or ceiling slab rapidly, and alone, in an accurate manner, with an inexpensive mechanical measuring device.

One complex gauge for measuring the length of an opening especially for use in orthopedic surgery is disclosed in U.S. Pat. No. 4,033,043 Cunningham in which the length of an opening such as in a bone is determined indirectly by the relative positions between a probe and an the elongated member.

A gauge for determining the depth of a hole, depression, indentation or the like is shown in U.S. Pat. No. 3,050,859 Wojcik in this the depth gauge is disclosed for measuring the depth of closed holes rather than pores through an element.

U.S. Pat. No. 4,165,566 Lycan discloses a gauge for measuring the offset of two structural members positioned at the end which basically comprises two sliding probes having mutually engaging side faces and contact end portions for engagement with structural members. The offset of such structural members will be indicated by the relative longitudinal positions of the bar members.

SUMMARY OF THE INVENTION

The present invention concerns an apparatus for determining the depth or thickness of a slab through which a bore has been made. The thickness of the slab used in the apparatus of the present invention can be determined by one person only without the need for assistance from a second person.

The device comprises a cylindrical piece having a proximal end and a distal end with lateral openings spaced inwardly from the distal end of said cylinder. Cylinder has length indicia running with the zero index there running from the inner edge of said openings to the proximal end of said cylinder located within the cylinder is a shaft slideable within the cylinder and having spaced inwardly from the distal end of said shaft a pair of molly butterfly arms spring biased to the open position so that when said shaft is drawn downwards the lines said butterfly arms with the lateral openings the butterfly arms will spring to the open position normal to the axis of the shaft.

In operation the cylinder is place through a bore drilled in the slab whose thickness is to be measured and the apparatus pushed through thereafter the shaft is withdrawn to a point where the butterflies are aligned with the lateral openings spring outwardly through the openings so as to engage the remote surface of the slab to be measured as the apparatus is further withdrawn from the bore. Once the butterfly arms engage the remote surface and as indicated will be aligned with a zero index on the cylinder the thickness of the slab can be read directly from the indicia adjacent the bore opening on the closer side of the slab. The apparatus is conveniently made of polyethylene or other plastic or metal. The spring is usually a wire form spring but other suitable variations may be used.

BRIEF DESCRIPTION OF THE DRAWING

In the accompanying drawings which forms a part of this specification:

FIG. 1 is a side plain view of the device of the present invention with the butterfly brace in its retracted position;

FIG. 2 shows the device with the butterflies spread;

FIG. 3 is an enlarged perspective view partially in phantom of the section indicated by lines 3—3 of FIG. 1;

FIG. 4 is an enlarged perspective view partially in phantom of the area indicated by lines 4—4 of FIG. 2;

ILLUSTRATIVE SPECIFIC EMBODIMENT

Figure 5:
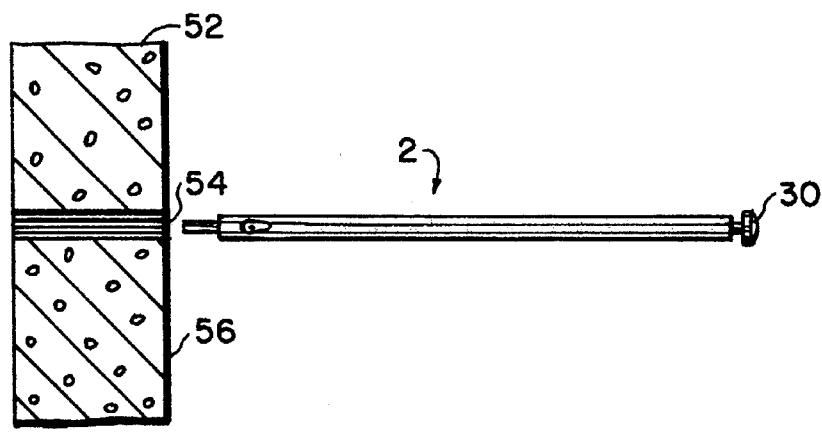
FIG. 5 is a side view showing the device approaching a bore hole in a section of wall element.

In the accompanying drawing, the device 2 of the present invention is shown in its ready state in FIG. 1 and comprises an outer cylindrical element 4 for having a distal end 6, and a proximal end 8. Spaced from, and adjacent, the distal end 6, is a pair of lateral longitudinal rectangular opening 10 and 12, which are formed in the side walls 14 of the outer cylinder 4. The openings 10 and 12 have inner ends 16 and outer ends 18 and the sides 20 and 22. An indicia scale 24 in inches or centimeters with the 0 end thereof coincidental with the inner end 16 of the opening 10 is located on the wall 14 of cylinder 4 as shown. Within the cylinder 4 is a shaft 28 having handle 30 on its proximal end 32. The diameter of the handle 26 is larger than the outer diameter of the cylinder 4. Spaced inwardly from the distal end 34 of the shaft 28 and carried on the shaft 28 by a transverse pin 36 is a pair of spring biased butterfly arms 34 and 36 which fold over each other as shown. They are spring biased by spring 48 to spread butterfly arms 34 and 36 to the open position indicated in FIG. 4.

Figure 6:
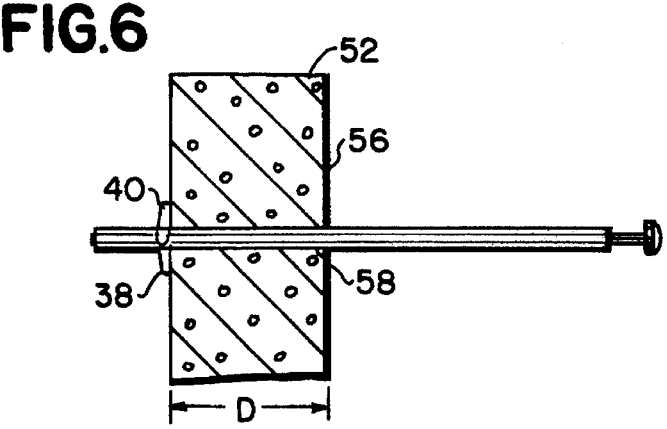
FIG. 6 shows the device in place and the thickness of the wall element being measured.
Figure 7:
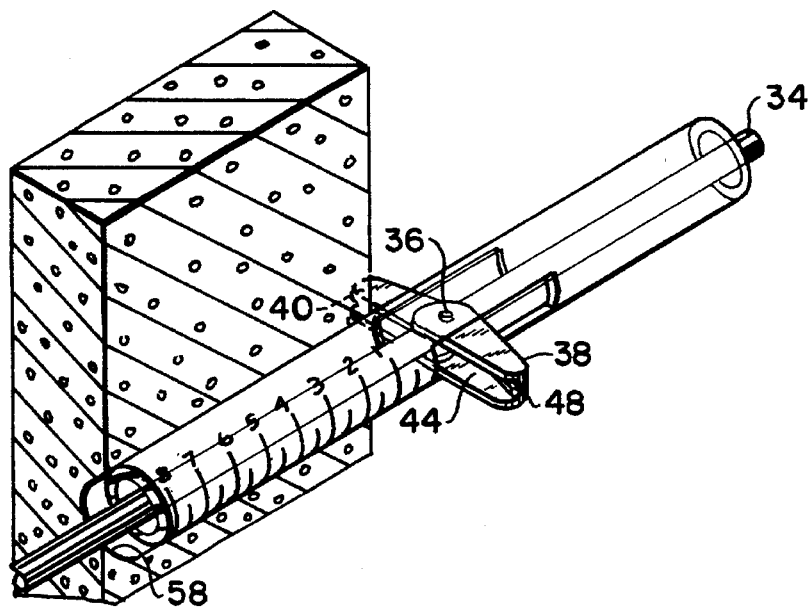
FIG. 7 is a close up of the device with the butterflies against the wall element and the depth of the wall element indicated by the indicia on the external cylindrical tubing.

In order to measure the depth of a slab element 52 a bore 54 slightly larger than the external diameter of the cylinder 4 is drilled through the slab or wall 52 as indicated at in FIGS. 5–7. The device 2, is then pushed through the bore 54 and the shaft 28 then is drawn back in cylinder 4 to the point that the butterflies 34 and 36 spring though the slots 10 and 12 in cylinder 4 into the open position indicated in FIG. 4. The device 2 is then withdrawn towards the user until the butterfly elements 36 and 38 on their inner edges 42 and 44 lock against the remote surface 56 of the wall 52 whose thickness is being measured. The depth D of the wall 52 being measured is then read directly from the indicia 24 on the cylinder 4 adjacent to the inner surface 58 of the wall 52.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. Apparatus for determining the thickness of a slab structure in which a cylindrical bore has been made connecting a remote and near surfaces of said slab said apparatus comprising a cylinder having a distal end and a proximal end, said cylinder having opposed longitudinally oriented lateral openings in the wall of said cylinder, said openings located inwardly from the distal end of said cylinder, said openings having inner and outer edges with an indicia scale of length running longitudinally and visible on the outer surface of said cylinder, the zero point of said indicia scale coincidental with the inner walls of said lateral openings in said cylinder, a shaft within said cylinder, said shaft having a length greater than said cylinder and having a proximal end and distal end, a handle on said proximal end of said shaft, a transverse pin spaced inwardly from the distal end of said shaft, passing through said shaft and mounted thereon a pair of butterfly arms, said butterfly arms spring biased to a spread position so that when said shaft is positioned so said butterfly arms are opposed to said lateral openings they extend outwardly through those openings and the inward surfaces of said butterfly arms are positioned perpendicularly to the inner edge of said openings and engageable with the remote surfaces of said slab when said shaft is moved with respect to said cylinder thereby displaying the depth of said slab and determining the depth of said slab by the position of said indicia with respect to the inner walls said slab.

* * * * *